July 4, 1950          F. L. MARTIN          2,513,661
CHILD'S VEHICLE

Filed June 25, 1947          3 Sheets-Sheet 1

F. L. Martin
INVENTOR
BY *CA Snow & Co.*
ATTORNEYS.

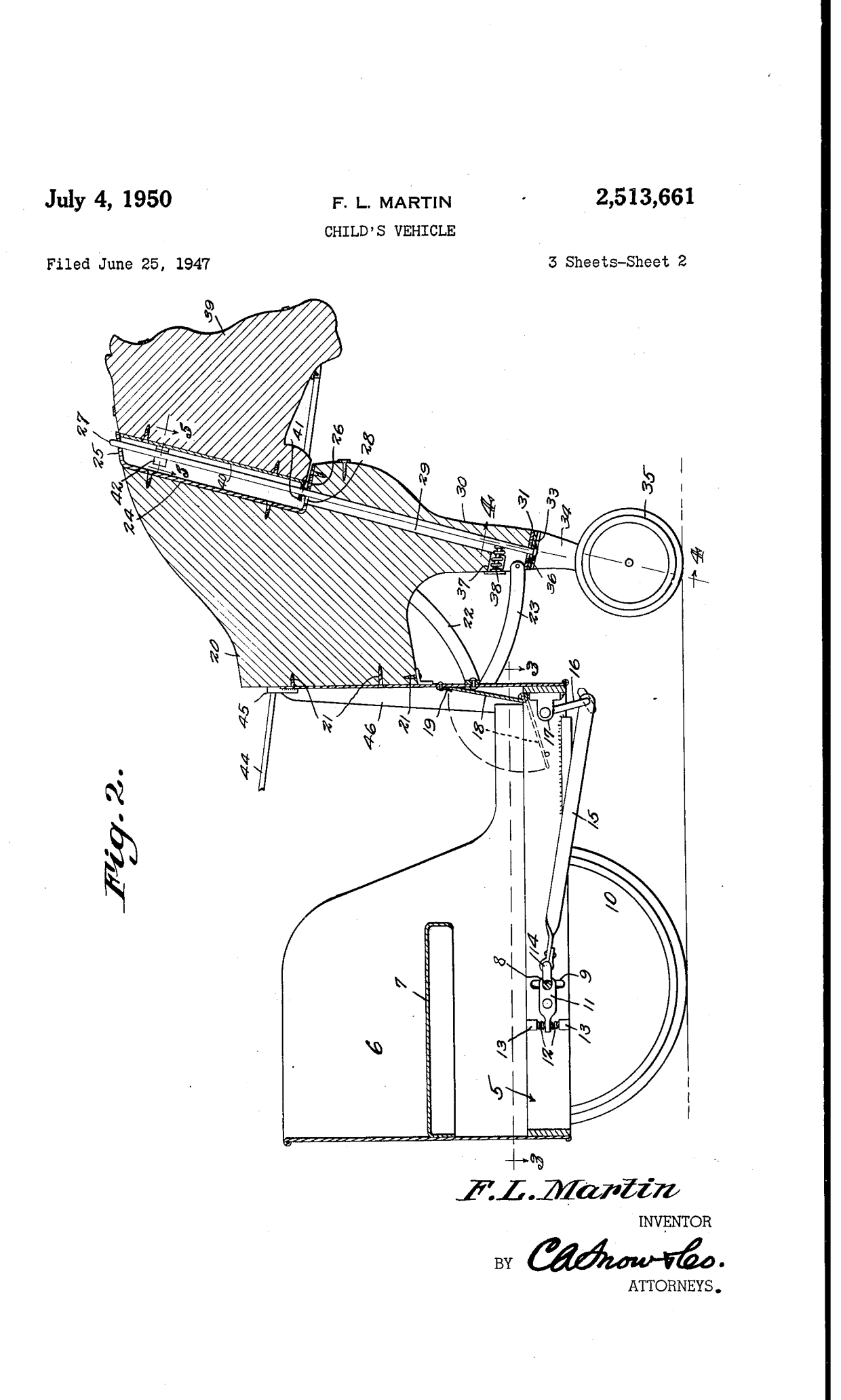

July 4, 1950     F. L. MARTIN     2,513,661
CHILD'S VEHICLE

Filed June 25, 1947     3 Sheets-Sheet 2

Fig. 2.

F. L. Martin
INVENTOR

BY *CA Snow & Co.*
ATTORNEYS.

July 4, 1950     F. L. MARTIN     2,513,661
CHILD'S VEHICLE
Filed June 25, 1947     3 Sheets-Sheet 3
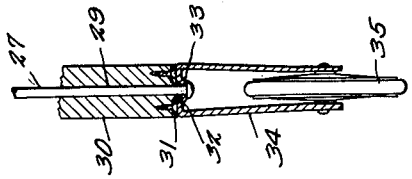
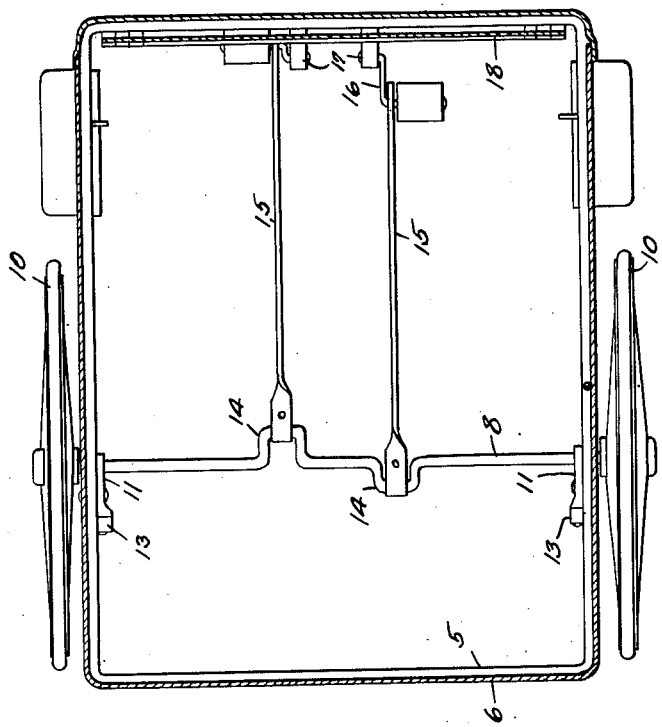
F. L. Martin
INVENTOR
BY *CA Snow & Co.*
ATTORNEYS.

Patented July 4, 1950

2,513,661

UNITED STATES PATENT OFFICE 2,513,661

CHILD'S VEHICLE

Floyd Leonard Martin, Berlin, Wis.

Application June 25, 1947, Serial No. 756,909

4 Claims. (Cl. 280—1.202)

This invention relates to toys or amusement devices in the form of a child's vehicle, the primary object of the invention being to provide a vehicle embodying rear-supporting wheels and a front-supporting wheel, the rear-supporting wheels providing a mounting for a vehicle body, while the front wheel provides a support for the forward end of the vehicle which is in the form of a head and legs, of an animal, such as a horse, the head of the front portion of the vehicle being so mounted that it may be turned by the occupant of the vehicle, simulating the movement of an animal's head.

An important object of the invention is to provide means for supporting the front wheel of the vehicle in such a way that rearward movement of the wheel will be cushioned, when the wheel meets an obstruction in the surface over which it is moved, thereby relieving the front portion and support for the wheel, of undue strain.

Still another object of the invention is to provide means for moving the front wheel of the vehicle, by the movements of the head of the forward section of the vehicle which is constructed to simulate an animal, the front wheel being so mounted that it will automatically move to its normal or straight position, when the reins which are connected with the head, are released.

With the foregoing and other objects in view which will appear as the description proceeds, the invention consists of certain novel details of construction and combinations of parts, hereinafter more fully described and pointed out in the claims, it being understood that the changes may be made in the construction and arrangement of parts without departing from the spirit of the invention as claimed.

Referring to the drawings

Figure 2 is a longitudinal sectional view thereof.

Figure 3 is a horizontal sectional view taken on line 3—3 of Figure 2.

Figure 4 is a sectional view taken on line 4—4 of Figure 2.

Figure 5 is a sectional view taken on line 5—5 of Figure 2.

Figure 1:
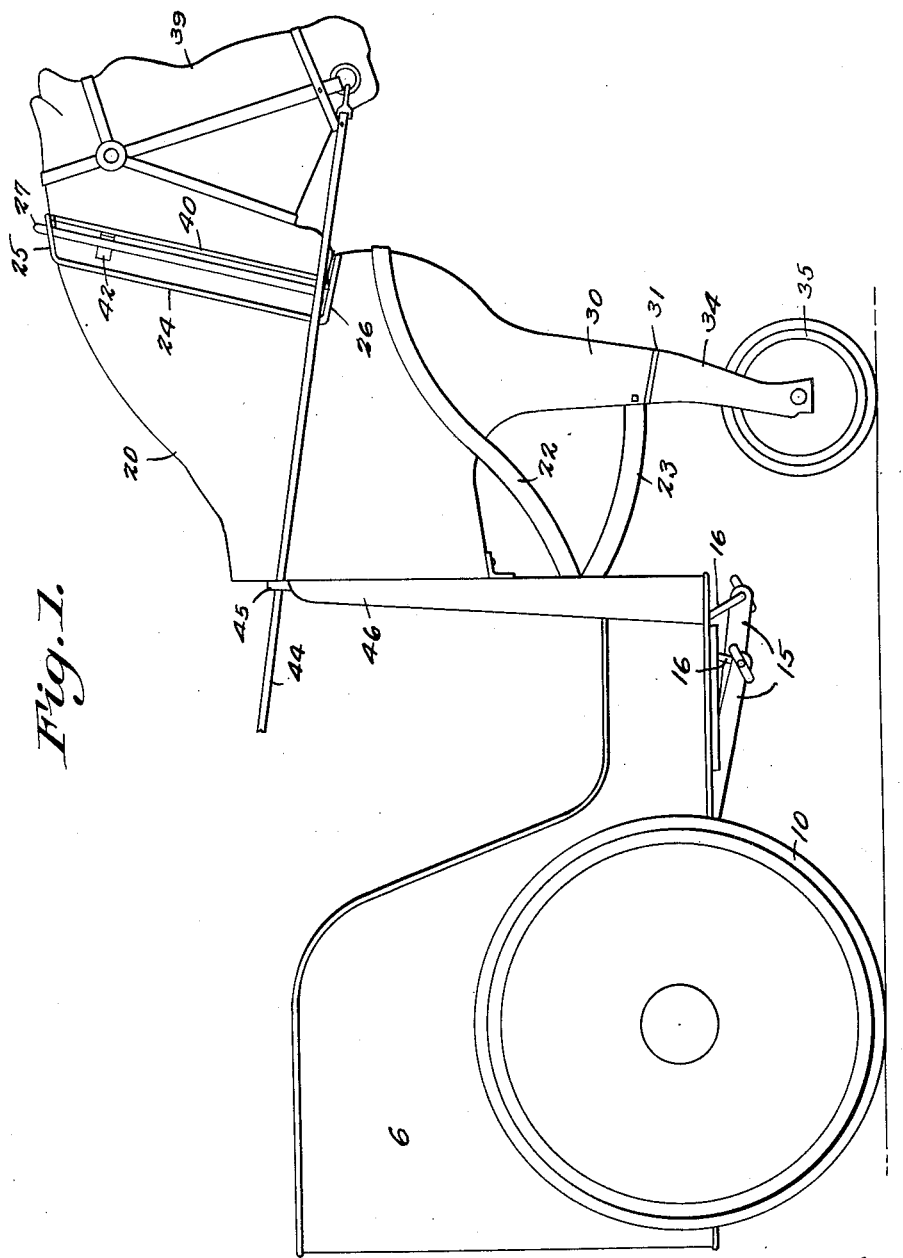
Figure 1 is a side elevational view of a child's vehicle, constructed in accordance with the invention.

Referring to the drawings in detail, the reference character 5 indicates a rectangular frame to which the body 6 is connected, the body being provided with a seat portion 7 arranged therein, the forward portion of the body being cut away to provide openings whereby the child using the vehicle, may easily enter the body portion.

The side rails of the frame 5 are formed with elongated openings in which the axle 8 is mounted, the openings being indicated by the reference character 9. These openings are elongated vertically, so that the axle 8 may move vertically when the wheels 10 mounted on the ends of the axle and secured thereto to rotate with the axle, move over obstructions in the surface over which the device is operating.

The axle 8 is mounted in the forward ends of the pivoted bearings 11 which are connected with the side rails of the frame 5, as clearly shown by Figure 2 of the drawings, the rear ends of the bearings 11 being tapered and fitted between the inner ends of the coiled springs 12 secured to the blocks 13, that in turn are secured to the side rails of the rectangular frame 5. Thus, it will be seen that due to this construction, I have provided a spring suspension for the body of the vehicle which will absorb shocks for the comfort of the child using the vehicle.

The axle 8 is formed with cranks 14 to which the links 15 are connected, the links 15 being also connected to the pedal cranks 16 that are mounted in bearings 17 at the front end of the rectangular frame.

Directly above the pedal cranks 16, is a plate 18 that is hingedly connected to the body and held normally in its upward position by means of the clip 19. This plate provides a foot rest for the feet of the child using the vehicle, when the child is not using the pedals for propulsion. With the plate swung downwardly to the dotted line position, the child not only has a foot rest, but his feet are guarded against injury by movement of the pedals.

The reference character 20 indicates the front portion of the vehicle, which is constructed to simulate the head, shoulders and front legs of a horse, the front portion of the vehicle being secured to the body of the vehicle, by means of the screws 21.

The forward portion of the vehicle is further braced by means of the metal strap material 22 that is secured to the forward portion of the vehicle, the rear ends thereof being connected to the forward portion of the body, the metal strap material being constructed to simulate thills. The brace 23 also extends forwardly from the body portion and connects with the front portion of the vehicle, at the portion thereof simulating the legs of the horse, as clearly shown by Figure 2 of the drawings.

The front portion of the vehicle is cut away near the upper front edge thereof, and this cutaway portion is provided with a bearing plate 24 which has forwardly extended ends 25 and 26, the end 25 being provided with an opening to receive the rod 27, which is pivotally held therein, the opening being sufficiently large to permit slight pivotal movement of the rod. The end 26 of the bearing plate 24 is provided with an elongated opening 28 in which the rod 27 operates, the elongated opening 28 permitting of rearward movement of the rod 27, to be hereinafter more fully described.

This rod extends through the vertical bore 29 formed in the front portion of the vehicle, the bore 29 being of a diameter appreciably larger than the diameter of the rod 27, so that movement of the rod within the bore will be permitted.

At the lower end of the front portion of the vehicle, or the legs 30, is a plate 31 that is formed with a downwardly extended enlargement 32, the enlargement 32 resting in the depression 33 formed in the upper end of the forks 34 in which the front wheel 35 operates. The rod 27 extends through the depression 33 and is provided with a head, securing the lower end of the rod to the forks 34. It might be further stated that the rod 27 extends through the elongated opening 36 of the plate 31, to the end that rearward movement of the rod with respect to the plate 31 is permitted, when the wheel 35 of the vehicle, strikes an obstruction in the surface over which it is moving.

An opening 37 is formed in the lower portion of the front portion of the vehicle, and accommodates the spring 38, which spring rests against the rod 27, and normally urges the rod forwardly within the bore 29. Due to this construction, it will be obvious that when the rod 27 and wheel 35 move rearwardly under the impact of striking an obstruction such as a curb or the like, the coiled spring 38 will act to return the rod to its normal position and at the same time cushion the movements of the front wheel.

The front portion of the vehicle includes the head 39 to the inner side thereof is attached the plate 40, which plate has a rearwardly extended end 41 formed with an opening through which the rod 27 extends. Adjacent to the upper end of the head 39 is a bracket 42 which is formed with a threaded opening to accommodate the set screw 43 that engages within an opening in the rod 27 and secures the head section to the rod 27 in such a way that under normal conditions, when the head section 39 is turned to the right or left, the rod 27 will also be turned, to guide the wheel 35.

When the head is moved to the right or left, and the wheel 35 turns, the enlargement 32 will move out of the depression 33, setting up a slight binding action. As the head is returned to its normal position, the enlargement 32 will again seat within the depression 33 and normally hold the head and wheel in a straight-forward line. The head section 39 is turned by means of the reins 44 that connect with the head, the reins being held in the guides 45 that rise from the dashboard 46 of the vehicle.

From the foregoing, it will be seen that a child seated on the seat 7, may operate the pedals to propel the device along a surface. However, should it be desired to pull the device, the foot rest 18 may be swung downwardly and the reins disconnected from the members 45. The device may now be pulled by the reins if desired.

What is claimed is:—

1. A vehicle of the class described, comprising a wheel-supported body including a front portion having a substantially vertical bore, a steering rod of a diameter substantially less than the diameter of the bore, mounted within the bore and being disposed longitudinally thereof, permitting transverse movement of the rod in the bore, a bearing plate mounted at the upper end of the bore, said bearing plate having an opening in which one end of the rod is rotatably mounted, the opposite end of said rod extending below the body, a wheel fork secured to the lower end of the rod below the body and being movable with said rod, a head connected to the rod and rotating said rod as the head is rotated, and yieldable means mounted within the bore adjacent to the lower end thereof, against which the lower end of the rod moves, restricting transverse movement of the rod.

2. A vehicle of the class described, comprising a wheel-supported body, the forward end of the body having a substantially vertical bore, a steering rod of a diameter substantially less than the diameter of the bore, mounted within the bore, means for pivotally connecting the upper end of the rod to the body, said rod being movable transversely of the bore, a spring disposed within the bore and engaging the rod, normally urging the rod against the wall of the bore restricting rearward movement of the rod, a fork and wheel secured to the lower end of the rod and being movable therewith, and means secured at the lower end of the forward end of the body and cooperating with the fork, preventing rotary movement of the fork with respect to the body, under normal conditions.

3. A vehicle of the class described, comprising a wheel-supported body, the forward portion of the body having a substantially vertical bore, a steering rod extending through the bore, means for pivotally connecting the upper end of said rod to the body, said rod being of a diameter substantially less than the diameter of the bore and being movable transversely within the bore, a head secured to the rod by means of which the rod is rotated, a fork and wheel secured to the lower end of the rod rotating with said rod, a spring mounted within the forward portion of the body, and bearing against the lower end of the rod normally urging the lower end of the rod forwardly, and cooperating means on the body and fork, normally restricting rotary movement of the rod and fork with respect to the forward portion of the body of the vehicle.

4. A vehicle of the class described, comprising a wheel-supported body, the forward portion of the body having a substantially vertical bore, a steering rod mounted within the bore, said rod being of a diameter appreciably less than the diameter of the bore and being movable rearwardly within the bore, the upper end of the rod being pivotally connected to the body, a stationary plate having an offset portion, secured to the forward portion of the body, adjacent to the lower end of said rod, a plate having an offset portion fitted in the offset portion of the adjacent plate and being secured to the rod to rotate therewith, the offset portions of the plates cooperating in restricting rotary movement of the fork and wheel with respect to the body, a head section secured to the steering rod by means of which the steering rod is operated and yieldable means disposed within the lower end of the bore, engaging said rod, limiting rearward movement of the rod, fork and wheel.

FLOYD LEONARD MARTIN.

REFERENCES CITED

The following references are of record in the file of this patent:

UNITED STATES PATENTS

| Number | Name | Date |
|---|---|---|
| 169,774 | Webster et al. | Nov. 9, 1875 |
| 779,709 | Hedstrom | Jan. 10, 1905 |
| 1,169,381 | Cotton | Jan. 25, 1916 |
| 1,230,801 | Schriver | June 19, 1917 |
| 1,649,946 | Brostedt | Nov. 22, 1927 |